(12) United States Patent
Su et al.

(10) Patent No.: US 11,425,665 B2
(45) Date of Patent: Aug. 23, 2022

(54) POWER ADJUSTMENT METHOD AND DEVICE, POWER ADJUSTMENT METHOD BASED ON POWER LINE COMMUNICATION

(71) Applicant: Gree Electric Appliances, Inc. of Zhuhai, Guangdong (CN)

(72) Inventors: Yuhai Su, Guangdong (CN); Weiyou Yu, Guangdong (CN); Jie Tang, Guangdong (CN); Quanzhou Liu, Guangdong (CN); Zhongzheng Li, Guangdong (CN); Wencan Wang, Guangdong (CN); Zhongwen Deng, Guangdong (CN); Tieying Ye, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 99 days.

(21) Appl. No.: 16/976,953

(22) PCT Filed: Dec. 12, 2018

(86) PCT No.: PCT/CN2018/120642
§ 371 (c)(1),
(2) Date: Aug. 31, 2020

(87) PCT Pub. No.: WO2019/165819
PCT Pub. Date: Sep. 6, 2019

(65) Prior Publication Data
US 2020/0396697 A1    Dec. 17, 2020

(30) Foreign Application Priority Data
Mar. 2, 2018    (CN) .......................... 201810176205.3

(51) Int. Cl.
| H04W 52/34 | (2009.01) |
| H04B 3/54 | (2006.01) |
| H04W 52/14 | (2009.01) |

(52) U.S. Cl.
CPC ............ *H04W 52/346* (2013.01); *H04B 3/54* (2013.01); *H04W 52/146* (2013.01); *H04W 52/343* (2013.01)

(58) Field of Classification Search
CPC ............ H04W 52/346; H04W 52/146; H04W 52/343; H04B 3/54
See application file for complete search history.

(56) References Cited

U.S. PATENT DOCUMENTS

| 2003/0039317 A1 * | 2/2003 | Taylor ................. H04L 27/2608 375/295 |
| 2004/0120249 A1 | 6/2004 | Blasco Claret et al. |

(Continued)

FOREIGN PATENT DOCUMENTS

| CN | 102075214 A | 5/2011 |
| CN | 102571152 A | 7/2012 |

(Continued)

OTHER PUBLICATIONS

Heggo et al., "A novel method for throughput enhancement of adaptive OFDM in attenuated power line channels," 2010 International Computer Engineering Conference (ICENCO), Giza, 2010, pp. 44-49, DOI: 10.1109/ICENCO.2010.5720424.

(Continued)

*Primary Examiner* — Steven H Nguyen
(74) *Attorney, Agent, or Firm* — The Webb Law Firm

(57) ABSTRACT

Disclosed by the present disclosure are a power adjustment method and device and a power adjustment method based on a power line communication. The power adjustment method include: acquiring a plurality of noise values, wherein the (Continued)

plurality of noise values include: a plurality of power line communication (PLC) noise values corresponding to a plurality of communication sub-carriers, and a background noise value of an air conditioning unit itself; determining a plurality of noise powers corresponding to the plurality of noise values; generating a power adjustment data of the plurality of communication sub-carriers according to the plurality of noise powers; and regulating the transmitting power values of the plurality of communication subcarriers according to the power adjustment data.

10 Claims, 5 Drawing Sheets

(56) References Cited

U.S. PATENT DOCUMENTS

2011/0103436 A1* 5/2011 Kim ............... H04L 5/0091
375/219

2013/0051482 A1* 2/2013 Nassar ............... H04B 3/542
375/257

2014/0307812 A1 10/2014 Chen

FOREIGN PATENT DOCUMENTS

| | | |
|---|---|---|
| CN | 104143999 A | 11/2014 |
| CN | 105656516 A | 6/2016 |
| CN | 106549690 A | 3/2017 |
| CN | 108541055 A | 9/2018 |
| WO | 02093775 A1 | 11/2002 |

OTHER PUBLICATIONS

Al-Mawali et al., "Adaptive power loading for OFDM-based power line communications impaired by impulsive noise," ISPLC2010, Piscataway, NJ 2010, pp. 178-182, DOI: 10.1109/ISPLC.2010.5479924.

* cited by examiner

POWER ADJUSTMENT METHOD AND DEVICE, POWER ADJUSTMENT METHOD BASED ON POWER LINE COMMUNICATION

This application is the United States national phase of International Application No. PCT/CN2018/120642 filed Dec. 12, 2018, and claims priority to Chinese Patent Application No. 201810176205.3 filed Mar. 2, 2018, the disclosures of which are hereby incorporated by reference in their entirety.

BACKGROUND OF THE INVENTION

Field of the Invention

The present disclosure relates to the field of power line communication technology, and in particular, to a power adjustment method and device, and a power adjustment method based on power line communication.

Description of Related Art

As an emerging communication technology, the power line communication technology has been widely used in fields such as electric meters and photovoltaic power stations, with such a communication mechanism as to couple communication signals into the power lines. However, there are very strict requirements for the electronic magnetic compatibility standards of the electrical devices, that is, the interference of the electrical devices transmitted to the power grid have to be within a certain range.

BRIEF DESCRIPTION OF THE DRAWINGS

The drawings described herein are used to provide a further understanding of the present disclosure and constitute a part of the present disclosure. The illustrative embodiments of the present disclosure as well as the descriptions thereof, which are used for explaining the present disclosure, do not constitute improper definitions on the present disclosure. In the accompanying drawings.

DESCRIPTION OF THE INVENTION

Figure 1:
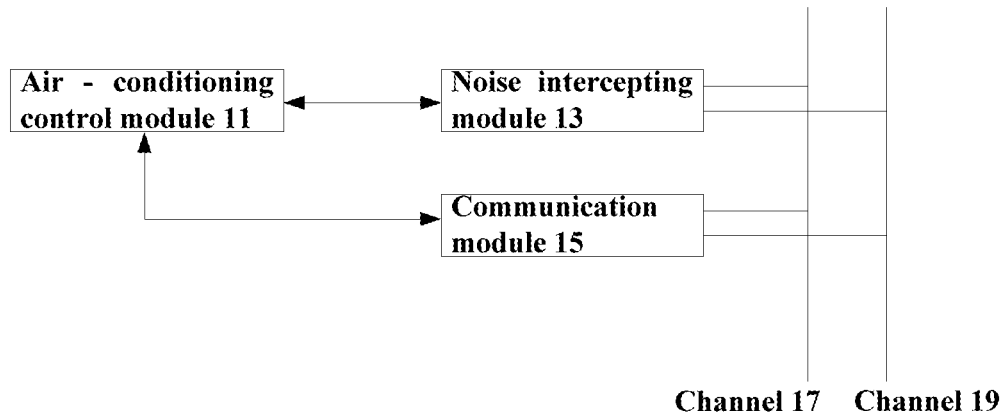
FIG. 1 is a schematic view of a power adjustment system according to some embodiments of the present disclosure.

In order to allow those skilled in the art to better understand the solution of the present disclosure, the technical solution in some embodiments of the present disclosure will be explicitly and completely described below in combination with the accompanying drawings in some embodiments of the present disclosure. Apparently, the described embodiments are merely part of some embodiments of the present disclosure, rather than all some embodiments. On the basis of some embodiments of the present disclosure, all the other embodiments acquired by a person skilled in the art on the premise that no inventive effort is involved should fall into the scope protected by the present disclosure.

It should be noted that the terms "first", "second" and the like in the specification and claims of the present disclosure and the above-described accompanying drawings are used to distinguish similar objects, and are not necessarily used to describe a specific order or sequence. It is to be understood that the data thus used is interchangeable as appropriate, such that some embodiments of the present disclosure described here can be implemented, in a sequence other than those illustrated or described here. In addition, the terms "comprise" and "has" as well as any of their deformations are intended to cover a non-exclusive inclusion. For example, the process, method, system, product, or device that contains a series of steps or units is not necessarily limited to those steps or units that are explicitly listed, but may comprise other steps or units that are not explicitly listed or that are inherent to such processes, methods, products or devices.

For convenient description, a detailed description will be made below to some nouns or terms appearing in the present disclosure:

Power Line Communication (PLC): is a unique communication manner of the power system. Power Line Communication refers to the technology of transmitting analog or digital signals at high speed in a carrier manner using the existing power lines.

Electronic Magnetic Compatibility (EMC): refers to the ability of a device or system to operate by conforming to the requirements in an electromagnetic environment without producing unendurable electromagnetic interference to any device in its environment. EMC comprises requirements in two aspects: on the one hand, it means that the electromagnetic interference produced by the device in the environment during normal operation cannot exceed a certain limit; on the other hand, there is a certain degree of resistance to electromagnetic interference present in the environment, i.e. electromagnetic sensitivity.

Power line communication technology: is power system communication with a power transmission line as a transmission medium of a carrier signal. Since the power transmission line has a very solid support structure erected with more than three conductors, the transmission line uses power frequency current to transmit a carrier signal whilst conveying power frequency current.

Channel: is a physical passage to convey information.

Coupling: refers to a phenomenon that there is close coordination and mutual influence between the input and output of two or more circuit elements or electrical networks, and energy is transmitted from one side to the other by interaction.

Carrier: refers to a radio wave of a specific frequency, which is a waveform modulated to transmit a signal, and generally a sine wave.

Noise power: also e.g., an equivalent noise power, is an incident infrared radiation power required when the signal-to-noise ratio is 1, also that is, the output voltage generated by the infrared radiation power projected on the microbolometer is equal to the noise voltage of the microbolometer itself.

Embodiment 1

When the power line communication technology is applied to the air-conditioning system in the related art, the communication signal conflicts with the EMC standard requirements of electromagnetic compatibility, which further results in the EMC bottleneck problem of the power line communication technology in the disclosure of the air-conditioning system.

In order to solve the above-described problem, a power adjustment system is proposed in some embodiments of the present disclosure. FIG. 1 is a schematic view of a power adjustment system according to some embodiments of the present disclosure. As shown in FIG. 1, the power adjustment system comprises: an air-conditioning control module 11, a noise intercepting module 13, a communication module 15, and channels 17 and 19.

The air-conditioning control module 11 is configured to set the communication network's transmission power and minimum number of communication sub-carriers according to an allowed minimum value determined by the communication network. It should be noted that, the transmission power has to be less than a threshold allowed by the EMC standards; the noise intercepting module 13 is configured to intercept the noise characteristics of the air-conditioning unit in real time; the communication module 15 is configured to adjust a state of a corresponding communication sub-carrier according to the power adjustment data generated by the air-conditioning control module 11; the channels 17 and 19 are both connected to the noise intercepting module 13 and the communication module 15, for signal transmission.

In some embodiments, the air-conditioning unit after power-on starts to work, and the air-conditioning control module 11 sends an intercepting instruction to the noise intercepting module 13, so that the noise intercepting module 13 starts real-time intercepting. The intercepting instruction comprises the noise amplitude of a frequency point of the communication sub-carrier needed to be intercepted. After receiving the intercepting instruction, the noise intercepting module 13 starts to receive and analyze the noise value generated on the power line by the air-conditioning unit during the process of operation in real time, and extracts its amplitude according to the frequency point of the communication sub-carrier to form data, and returns the data to the air-conditioning control module 11.

In addition, when receiving a noise value of each communication sub-carrier written in by the noise intercepting module 13 or externally, the air-conditioning control module 11 may perform a superposition operation according to a minimum power P1 allowed by the communication network. In some embodiments, the minimum power P1 and the noise power are added to obtain a superimposed power which is then compared with the EMC threshold. In the case where the superimposed power is greater than the EMC threshold, the transmission power value of the communication sub-carrier is reduced, so that the superimposed power is within the range of the above-described EMC threshold. Since there are a plurality of communication sub-carriers described above, it is necessary to calculate a superimposed power of each of the communication sub-carriers to form the power adjustment data corresponding to each communication sub-carrier, and then send the power adjustment data to the communication module 15, which then adjusts a state of the carrier channel of each communication sub-carrier according to the above-described power adjustment data, so as to ensure that the air-conditioning system may communicate normally.

It should be noted that, in the case where the requirements of the EMC standards cannot be met in a minimum power output state, there is a need to report a communication failure, thus prompting that it is necessary to reduce the noise interference of an air-conditioning unit itself.

In addition, it should be noted that, during the entire adjustment process, the above-mentioned communication module 15 only serves as an execution unit, and all the operation instructions need to be executed according to the air-conditioning control module 11.

Embodiment 2

According to some embodiments of the present disclosure, some method embodiments of a power adjustment method are provided. It should be noted that the steps shown in the flowchart of the accompanying drawings may be executed in a computer system such as a set of computer-executable instructions. Moreover, although a logical sequence is shown in the flowchart, in some cases, the steps shown or described may be performed in a sequence different from here.

Figure 2:
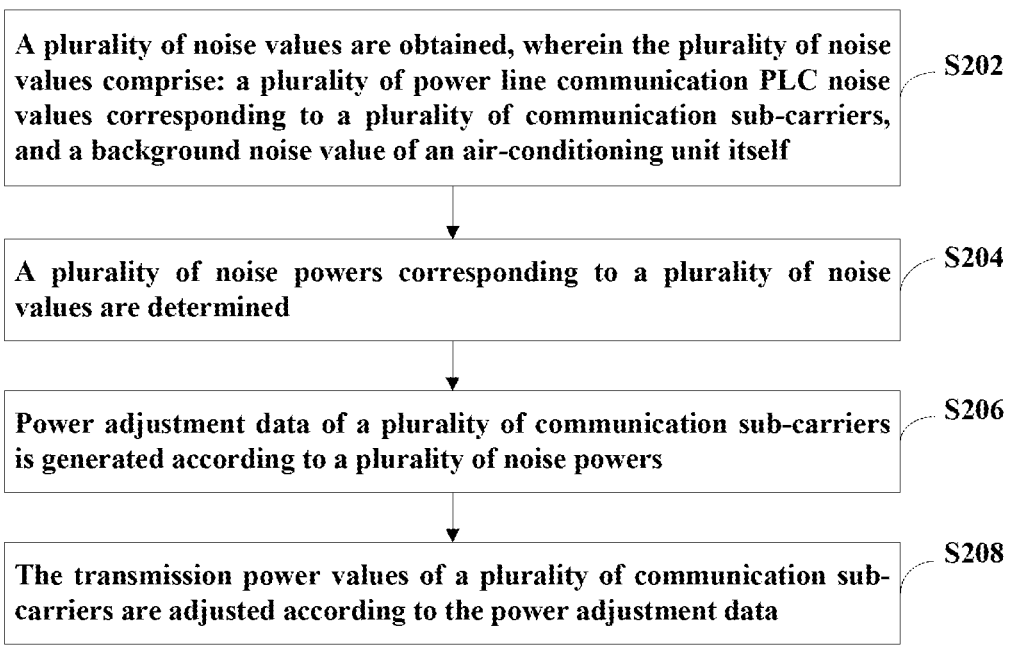
FIG. 2 is a flowchart of a power adjustment method according to some embodiments of the present disclosure.

FIG. 2 is a flowchart of a power adjustment method according to some embodiments of the present disclosure. As shown in FIG. 2, the power adjustment method comprises the following steps:

In step S202, a plurality of noise values are obtained, wherein the plurality of noise values comprise: a plurality of power line communication (PLC) noise values corresponding to a plurality of communication sub-carriers, and a background noise value of an air-conditioning unit itself. Each of the plurality of noise values comprises a PLC noise value corresponding to a communication sub-carrier and the background noise value of the air-conditioning unit.

In step S204, a plurality of noise powers corresponding to a plurality of noise values are determined. Each of the plurality of noise values corresponds to a noise power.

In step S206, power adjustment data of a plurality of communication sub-carriers is generated according to a plurality of noise powers.

In order to facilitate management, it is possible to establish a mapping relationship between the above-described power adjustment data and a plurality of noise powers in one-to-one correspondence, so as to form a power adjustment data table.

In step S208, the transmission power values of a plurality of communication sub-carriers are adjusted according to the power adjustment data.

By the above-described steps, it is possible to obtain a plurality of noise values, wherein the plurality of noise values comprise a plurality of PLC noise values corresponding to a plurality of communication sub-carriers, and a background noise value of an air-conditioning unit itself, then determine a plurality of noise powers corresponding to a plurality of noise values. Next, the power adjustment data of the plurality of communication sub-carriers are generated according to a plurality of noise powers and then the transmission power values of the plurality of communication sub-carriers are adjusted according to the power adjustment data. Compared with the related art where there is a drawback of EMC bottleneck when the power line communication technology is applied to the air-conditioning system, the power adjustment method provided by some embodiments of the present disclosure may realize the purpose that in the case where the EMC requirements cannot be met when the power line communication technology is applied to the air-conditioning system, the transmission power of the communication sub-carriers meets the EMC requirements in such a manner as to dynamically adjust the output power of the communication sub-carriers, so as to achieve the effect of reducing the intensity of the communication sub-carriers so that the transmission power of the communication sub-carriers meets the EMC requirements, thereby solving the technical problem that it is impossible to apply the power line communication technology to the air-conditioning system according to the output power of the communication sub-carrier in the related art.

Figure 4:
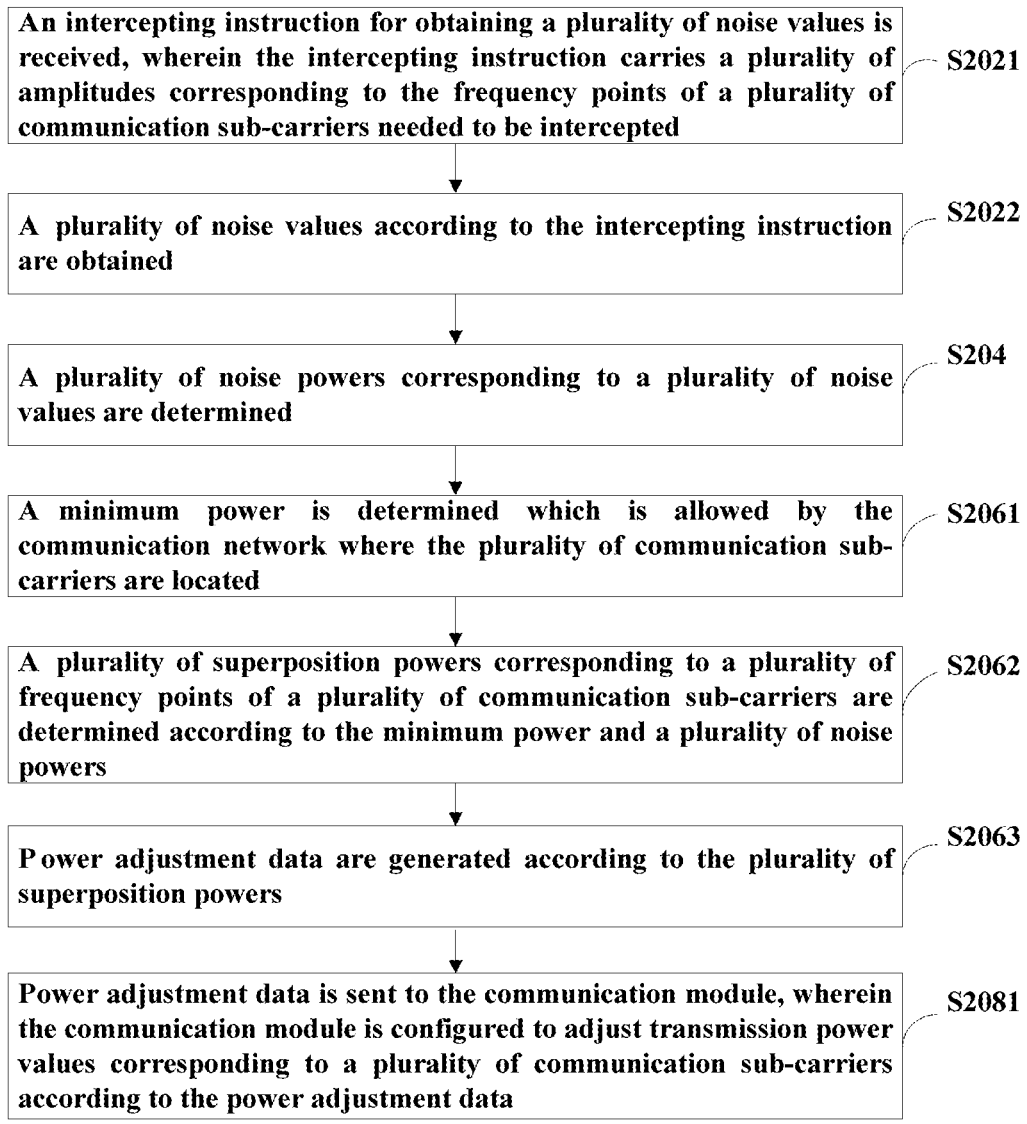
FIG. 4 is another flowchart of a power adjustment method according to some embodiments of the present disclosure.

As some alternative embodiments, the step S202 described above of that a plurality of noise values are obtained comprises step S2021 and step S2022 (as shown in FIG. 4). In step S2021, an intercepting instruction for obtaining a plurality of noise values is received, wherein the intercepting instruction carries a plurality of amplitudes corresponding to the frequency points of a plurality of communication sub-carriers needed to be intercepted. And in step 2022, a plurality of noise values according to the intercepting instruction are obtained. A frequency point of the communication sub-carrier corresponds to an amplitude. The above-mentioned a plurality of noise values can be obtained in the following manner.

First, in the case where the power line communication operates, the air-conditioning unit is powered on and started to work, and the air-conditioning control module sends an intercepting instruction to the noise intercepting module, so that the noise intercepting module starts real-time intercepting. The intercepting instruction comprises the noise amplitudes of the frequency points of the communication sub-carriers needed to be intercepted. After receiving the intercepting instruction, the noise intercepting module starts to receive and analyze the noise value generated on power line by the air-conditioning unit during the process of operation in real time, and extracts its amplitude according to the frequency point of the communication sub-carrier to form data, and returns the data to the air-conditioning control module.

Second, in the case where the power line communication does not operate, the air-conditioning unit is powered on to a rated operation state, the noise spectrum value is read by a spectrum analysis tool (for example, spectrum analyzer, EMC receiver), and then the corresponding communication carrier noise value is written into the air-conditioning control module for storage and analysis.

As some alternative embodiments, the step S206 described above of that power adjustment data of a plurality of communication sub-carriers is generated according to a plurality of noise powers comprises step S2061, step S2062 and step S2063 (as shown in FIG. 4). In step S2061, a minimum power is determined which is allowed by the communication network where the plurality of communication sub-carriers are located. In step S2062, a plurality of superposition powers corresponding to a plurality of frequency points of a plurality of communication sub-carriers are determined according to the minimum power and a plurality of noise powers. And in step S2063, power adjustment data are generated according to the plurality of superposition powers. For example, a superposition power of each frequency point corresponding to the communication sub-carrier is determined according to the minimum power and each of the plurality of noise powers; power adjustment data is generated according to each superposition power.

Figure 5:
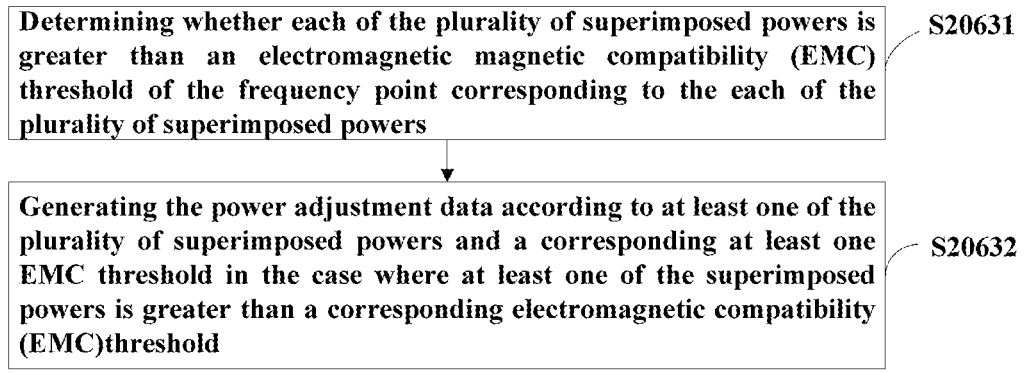
FIG. 5 is another flowchart of a power adjustment method according to some embodiments of the present disclosure.

In some embodiments, generating power adjustment data according to a plurality of superimposed powers comprises: determining whether the plurality of superimposed powers are greater than electromagnetic compatibility (EMC) thresholds corresponding to a plurality of frequency points, so as to obtain a determination result; generating power adjustment data according to the plurality of superimposed powers and the EMC thresholds in the case where there is a determination result that the plurality of superimposed powers are greater than electromagnetic compatibility (EMC) thresholds corresponding to a plurality of frequency points. For example, as shown in FIG. 5, in step S20631, determining whether each of the plurality of superimposed powers is greater than an electromagnetic magnetic compatibility (EMC) threshold of the frequency point corresponding to the each of the plurality of superimposed powers; and in step S20632, generating the power adjustment data according to at least one of the plurality of superimposed powers and a corresponding at least one EMC threshold in the case where at least one of the superimposed powers is greater than a corresponding electromagnetic compatibility (EMC) threshold.

For example, when the noise value of each communication sub-carrier written in by the intercepting module or externally is received, the superimposition operation may be performed according to the minimum power P1 allowed by the communication network. That is, each superimposed power is obtained by a superimposition operation of P1 and the noise power, and then the superimposed power is compared with the EMC threshold corresponding to the frequency point of the communication sub-carrier. In the case where the superimposed power is greater than the EMC threshold corresponding to the frequency point of the communication sub-carrier, the transmission power value of the communication sub-carrier is reduced, so that the superimposed power after superimposition is within a corresponding EMC threshold range. Since there are a plurality of communication sub-carriers described above, it is necessary to calculate the superimposed power of each communication sub-carrier, so as to form power adjustment data corresponding to each communication sub-carrier. Then, the power adjustment data is sent to the communication module. The communication module adjusts a state of the carrier channel of each communication sub-carrier according to the above-described power adjustment data, so as to ensure that the air-conditioning system may communicate normally.

As some alternative embodiments, the step S208 described above of that the transmission power values of a plurality of communication sub-carriers are adjusted according to the power adjustment data comprises step S2081 (as shown in FIG. 4) that power adjustment data is sent to the communication module, wherein the communication module is configured to adjust transmission power values corresponding to a plurality of communication sub-carriers according to the power adjustment data. The state of the plurality of carrier channels corresponding to the plurality of communication sub-carriers is controlled according to the power adjustment data, so as to adjust the intensity of the transmission power values corresponding to the plurality of communication sub-carriers, thereby allowing that the transmission power of the communication sub-carriers meets the EMC requirements.

In some embodiments, generating power adjustment data of a plurality of communication sub-carriers according to a plurality of noise powers comprises: determining a minimum power allowed by the communication network where the plurality of communication sub-carriers are located; determining a plurality of communication sub-carriers according to the minimum power and a plurality of noise powers; determining a plurality of superimposed powers of a plurality of frequency points corresponding to a plurality of communication sub-carriers; generating power adjustment data according to the plurality of superimposed powers.

In some embodiments, generating power adjustment data according to a plurality of superimposed powers comprises: determining whether the plurality of superimposed powers are greater than electromagnetic compatibility (EMC) thresholds corresponding to a plurality of frequency points, so as to obtain a determination result; generating power adjustment data according to the plurality of superimposed powers and the EMC thresholds in the case where there is a determination result that the plurality of superimposed powers are greater than electromagnetic compatibility (EMC) thresholds corresponding to a plurality of frequency points.

In some embodiments, adjusting transmission power values of a plurality of communication sub-carriers according to the power adjustment data comprises: sending the power adjustment data to the communication module, wherein the communication module is configured to adjust transmission power values corresponding to the plurality of communication sub-carriers according to the power adjustment data.

Embodiment 3

According to another aspect of some embodiments of the present disclosure, a power adjustment method based on power line communication is also provided, comprising the power adjustment method in any one of the Embodiment 2 above.

Embodiment 4

In some embodiments of the present disclosure, a power adjustment device is also provided. It should be noted that, the power adjustment device provided by some embodiments of the present disclosure may be used to execute the power adjustment method provided by some embodiments of the present disclosure. The power adjustment device provided by some embodiments of the present disclosure will be introduced below.

Figure 3:
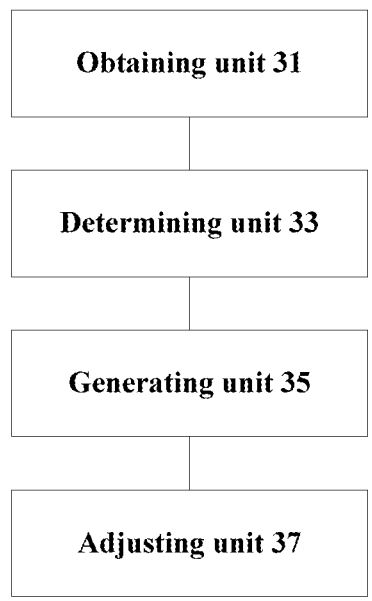
FIG. 3 is a schematic view of a power adjustment device according to some embodiments of the present disclosure.

FIG. 3 is a schematic view of a power adjustment device according to some embodiments of the present disclosure. As shown in FIG. 3, the power adjustment device comprises: an obtaining unit 31, a determining unit 33, a generating unit 35, and an adjusting unit 37. The power adjustment device will be described in detail below.

The obtaining unit 31 is configured to obtain a plurality of noise values, wherein the plurality of noise values comprise: a plurality of power line communication (PLC) noise values corresponding to a plurality of communication sub-carriers corresponding to a plurality of output powers, and a background noise value of an air-conditioning unit itself.

The determining unit 33 is connected to the above-mentioned obtaining unit 31, and configured to determine a plurality of noise powers corresponding to a plurality of noise values respectively.

The generating unit 35 is connected to the above-mentioned determining unit 33, and configured to generate power adjustment data of a plurality of communication sub-carriers according to a plurality of noise powers.

The adjusting unit 37 is connected to the above-mentioned generating unit 35, and configured to adjust transmission power values of a plurality of communication sub-carriers according to the power adjustment data.

By the above-described embodiments, it is possible to use an obtaining unit configured to obtain a plurality of noise values, wherein the plurality of noise values comprise: a plurality of power line communication (PLC) noise values corresponding to a plurality of communication sub-carriers corresponding to a plurality of output powers, and a background noise value of an air-conditioning unit itself; a determining unit configured to determine a plurality of noise powers corresponding to a plurality of noise values respectively; a generating unit configured to generate power adjustment data of a plurality of communication sub-carriers according to a plurality of noise powers; an adjusting unit configured to adjust transmission power values of a plurality of communication sub-carriers according to the power adjustment data. The power adjustment device provided by some embodiments of the present disclosure may realize the purpose that in the case where the EMC requirements cannot be met when the power line communication technology is applied to the air-conditioning system, the transmission power of the communication sub-carriers meets the EMC requirements in such a manner as to dynamically adjust the output power of the communication sub-carriers, so as to achieve the effect of reducing the intensity of the communication sub-carriers so that the transmission power of the communication sub-carriers meets the EMC requirements, thereby solving the technical problem that it is impossible to apply the power line communication technology to the air-conditioning system according to the output power of the communication sub-carrier in the related art.

Figure 6:
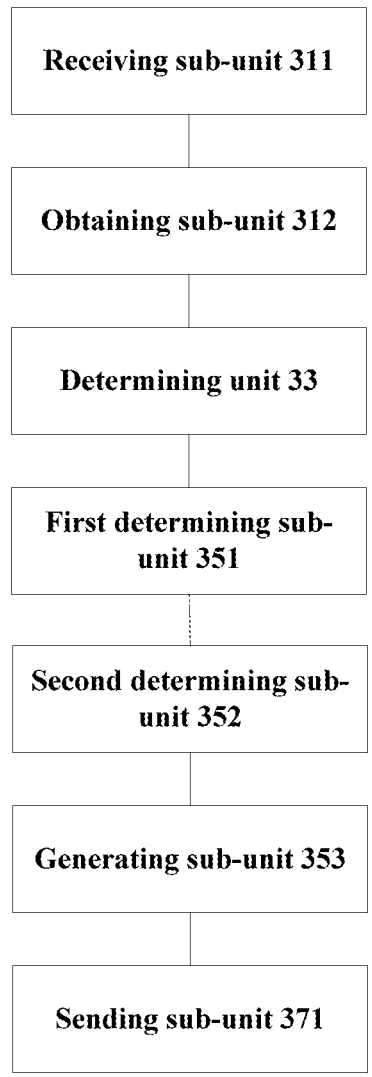
FIG. 6 is another schematic view of a power adjustment device according to some embodiments of the present disclosure.

In some alternative embodiments of the present disclosure, as shown in FIG. 6, the above-described obtaining unit 31 comprises: a receiving sub-unit 311 configured to receive an intercepting instruction for obtaining a plurality of noise values, wherein the intercepting instruction carries a plurality of amplitudes corresponding to the frequency points of a plurality of communication sub-carriers; and an obtaining sub-unit 312 configured to obtain a plurality of noise values according to the intercepting instruction.

In some alternative embodiments of the present disclosure, as shown in FIG. 6, the above-described generating unit 35 comprises: a first determining sub-unit 351 configured to determine a minimum power of the communication network where a plurality of communication sub-carriers are located; a second determining sub-unit 352 configured to determine a plurality of superimposed powers corresponding to a plurality of frequency points of a plurality of communication sub-carriers according to the minimum power and a plurality of noise powers; and a generating sub-unit 353 configured to generate power adjustment data according to the plurality of superimposed powers.

Figure 7:
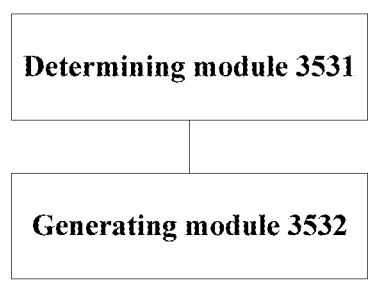
FIG. 7 is another schematic view of a power adjustment device according to some embodiments of the present disclosure.

In some alternative embodiments of the present disclosure, as shown in FIG. 7, the above-described generating sub-unit 353 comprises: a determining module 3531 configured to determine whether a plurality of superimposed powers are greater than electromagnetic compatibility (EMC) thresholds corresponding to a plurality of frequency points, so as to obtain a judgment result; and a generating module 3532 configured to generate power adjustment data according to the plurality of superimposed power and the EMC threshold in the case where there is a judgment result that a plurality of superimposed powers are greater than electromagnetic compatibility (EMC) thresholds corresponding to a plurality of frequency points.

In some alternative embodiments of the present disclosure, as shown in FIG. 6, the above-described adjusting unit 37 comprises: a sending sub-unit 371 configured to send power adjustment data to the communication module, wherein the communication module is configured to adjust transmission power values corresponding to a plurality of communication sub-carriers according to the power adjustment data.

Figure 8:
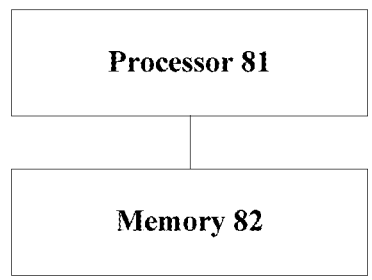
FIG. 8 is another schematic view of a power adjustment device according to some embodiments of the present disclosure.

In some embodiments, as shown in FIG. 8, the above-described power adjustment device further comprises a processor 81 and a memory 82. The obtaining unit 31, the determining unit 33, the generating unit 35, and the adjusting unit 37 described above are all stored in the memory 82 as program units, such that the above-described programs units stored in the memory 82 are executed by the processor 81 to achieve a corresponding function.

The above-described processor contains an inner core, which retrieves a corresponding program unit from the memory. One or more inner cores may be provided, such that the transmission power values of a plurality of communication sub-carriers are adjusted according to power adjustment data by adjusting the parameters of the inner core.

The above-described memory may comprise non-permanent memory in a computer readable medium, in the forms such as random access memory (RAM) and/or non-volatile memory, for example read only memory (ROM) or flash memory (flash RAM). The memory comprises at least one memory chip.

According to another aspect of some embodiments of the present disclosure, a storage medium is also provided. The storage medium comprises a stored program, wherein the program executes any one of the above-described power adjustment methods and the above-described power adjustment method based on power line communication.

According to another aspect of some embodiments of the present disclosure, a processor is also provided. The processor is configured to run a program, wherein the program when run executes any one of the above-described power adjustment methods, or the power adjustment method based on power line communication.

In some embodiments of the present disclosure, a computer program product is also provided. The computer program product when executed on a data processing device, is adapted to execute a program initialized with the following steps of the method: obtaining a plurality of noise values, wherein the plurality of noise values comprise: a plurality of power line communication (PLC) noise values corresponding to a plurality of communication sub-carriers, and a background noise value of an air-conditioning unit itself; determining a plurality of noise powers corresponding to a plurality of noise values; generating power adjustment data of a plurality of communication sub-carriers according to a plurality of noise powers; adjusting transmission power values of a plurality of communication sub-carriers according to the power adjustment data.

In some embodiments of the present disclosure, a device is also provided. The device comprises a processor, a memory, and a program stored on the memory and executable on the processor. When the processor executes the program, the following steps are implemented: obtaining a plurality of noise values, wherein the plurality of noise values comprise: a plurality of power line communication (PLC) noise values corresponding to a plurality of communication sub-carriers, and a background noise value of an air-conditioning unit itself; determining a plurality of noise powers corresponding to the plurality of noise values; generating power adjustment data of a plurality of communication sub-carriers according to a plurality of noise powers; adjusting transmission power values of a plurality of communication sub-carriers according to the power adjustment data.

The serial numbers of the above-described embodiments of the present disclosure which are only for description, do not represent the advantages and disadvantages of some embodiments.

In the above-described embodiments of the present disclosure, the description of each embodiment has its own emphasis. For a part that is not detailed in a certain embodiment, reference may be made to the related descriptions of other embodiments.

In the several embodiments provided in the present disclosure, it should be understood that the disclosed technical content may be implemented in other ways. The device embodiments described above are only schematic. For example, the division of the unit may be a logical function division. In actual implementation, there may be another division manner. For example, a plurality of units or assemblies may be combined or integrated into another system, or some features may be ignored, or not implemented. In addition, mutual coupling or direct coupling or communication connection displayed or discussed may be indirect coupling or communication connection through some interfaces, units or modules, and may be in electrical or other forms.

The units described as separate components may or may not be physically separated, and the components displayed as units may or may not be physical units. That is, they may be located in one place, or may be distributed on a plurality of units. Some or all of the units may be selected according to actual needs to achieve the purpose of the solution of the present embodiments.

In addition, each functional unit in each embodiment of the present disclosure may be integrated into one processing unit, or each unit may exist alone physically. In some embodiments, two or more units may be integrated into one unit. The integrated unit described above may be implemented in the form of hardware or a software functional unit.

If implemented in the form of a software functional unit and sold or used as an independent product, the integrated unit may be stored in a computer-readable storage medium. Based on such understanding, the technical solution of the present disclosure or a part contributing to the related art or an entirety or part of the technical solution may be embodied in the form of a software product. The computer software product which is stored in a storage medium, comprises several instructions to enable a computer device (which may be a personal computer, a server, a network device, or the like) to perform all or some of the steps of the methods described in various embodiments of the present disclosure. The aforementioned storage medium comprises: any medium that may store program codes, such as U disk, read-only memory (ROM), random access memory (RAM), mobile hard disk, magnetic disk or optical disk.

The above-described descriptions are only some embodiments of the present disclosure. It should be noted that: those skilled in the art may also make several improvements and refinements without departing from the principles of the present disclosure, which modifications and refinements are also considered to be within the protection scope of the present disclosure.

What is claimed is:

1. A power adjustment method, comprising:
obtaining a plurality of noise values, wherein the plurality of noise values comprise: a plurality of power line communication (PLC) noise values corresponding to a plurality of communication sub-carriers, and a background noise value of an air-conditioning unit;

determining a plurality of noise powers corresponding to the plurality of noise values;

determining a minimum power allowed by a communication network where the plurality of communication sub-carriers are located;

determining a plurality of superimposed powers corresponding to frequency points of the plurality of communication sub-carriers according to the minimum power and the plurality of noise powers;

generating the power adjustment data according to the plurality of superimposed powers; and adjusting transmission power values of the plurality of communication sub-carriers according to the power adjustment data.

2. The power adjustment method according to claim 1, wherein obtaining the plurality of noise values comprises:

receiving an intercepting instruction for obtaining the plurality of noise values, wherein the intercepting instruction carries a plurality of amplitudes corresponding to frequency points of the plurality of communication sub-carriers to be intercepted; and obtaining the plurality of noise values according to the intercepting instruction.

3. The power adjustment method according to claim 1, wherein generating the power adjustment data according to the plurality of superimposed powers comprises:

determining whether each of the plurality of superimposed powers is greater than an electromagnetic magnetic compatibility (EMC) threshold of the frequency point corresponding to the each of the plurality of superimposed powers, so as to obtain a determination result; and generating the power adjustment data according to at least one of the plurality of superimposed powers and a corresponding at least one EMC threshold in the case where there is a determination result that at least one of the plurality of superimposed powers is greater than a corresponding electromagnetic compatibility (EMC) threshold.

4. The power adjustment method according to claim 1, wherein adjusting transmission power values of the plurality of communication sub-carriers according to the power adjustment data comprises:

sending the power adjustment data to a communication module, wherein the communication module is configured to adjust transmission power values corresponding to the plurality of communication sub-carriers according to the power adjustment data.

5. The power adjustment method based on power line communication, comprising the power adjustment method according to claim 1 described above.

6. A non-transitory computer readable storage medium comprising a stored program, wherein the program executes the power adjustment method according to claim 1.

7. A power adjustment device, comprising:
a memory; and
a processor coupled to the memory, and configured to run a program, wherein the program when executes a power adjustment method comprising:

obtaining a plurality of noise values, wherein the plurality of noise values comprise: a plurality of power line communication (PLC) noise values corresponding to a plurality of communication sub-carriers, and a background noise value of an air-conditioning unit;

determining a plurality of noise powers corresponding to the plurality of noise values;

determining a minimum power allowed by a communication network where the plurality of communication sub-carriers are located;

determining a plurality of superimposed powers corresponding to frequency points of the plurality of communication sub-carriers according to the minimum power and the plurality of noise powers;

generating the power adjustment data according to the plurality of superimposed powers; and adjusting transmission power values of the plurality of communication sub-carriers according to the power adjustment data.

8. The power adjustment device according to claim 7, wherein obtaining the plurality of noise values comprises:

receiving an intercepting instruction for obtaining the plurality of noise values, wherein the intercepting instruction carries a plurality of amplitudes corresponding to frequency points of the plurality of communication sub-carriers to be intercepted; and obtaining the plurality of noise values according to the intercepting instruction.

9. The power adjustment device according to claim 7, wherein generating the power adjustment data according to the plurality of superimposed powers comprises:

determining whether each of the plurality of superimposed powers is greater than an electromagnetic magnetic compatibility (EMC) threshold of the frequency point corresponding to the each of the plurality of superimposed powers, so as to obtain a determination result; and generating the power adjustment data according to at least one of the plurality of superimposed powers and a corresponding at least one EMC threshold in the case where there is a determination result that at least one of the plurality of superimposed powers is greater than a corresponding electromagnetic compatibility (EMC) threshold.

10. The power adjustment device according to claim 7, wherein adjusting transmission power values of the plurality of communication sub-carriers according to the power adjustment data comprises:

sending the power adjustment data to a communication module, wherein the communication module is configured to adjust transmission power values corresponding to the plurality of communication sub-carriers according to the power adjustment data.

\* \* \* \* \*